United States Patent [19]

O'Rell et al.

[11] 4,368,243
[45] Jan. 11, 1983

[54] BATTERY SEPARATOR

[75] Inventors: Dennis D. O'Rell, Boxborough; Nan J. Lin, Burlington, both of Mass.

[73] Assignee: W. R. Grace & Co., New York, N.Y.

[21] Appl. No.: 240,401

[22] Filed: Mar. 4, 1981

Related U.S. Application Data

[63] Continuation-in-part of Ser. No. 195,918, Oct. 10, 1980, abandoned, which is a continuation of Ser. No. 51,175, Jun. 22, 1979, Pat. No. 4,228,225.

[51] Int. Cl.³ .............................................. H01M 2/18
[52] U.S. Cl. .................................... 429/147; 429/253; 429/254
[58] Field of Search ............... 429/147, 251, 253, 254, 429/146, 247, 81

[56] References Cited

U.S. PATENT DOCUMENTS

| | | | |
|---|---|---|---|
| 729,100 | 5/1903 | Sperry | 429/147 |
| 2,465,493 | 3/1949 | Strickhouser et al. | 429/147 |
| 2,579,589 | 12/1951 | Lehmberg | 429/147 |
| 2,662,106 | 12/1953 | Uhlig et al. | 429/147 |
| 2,850,559 | 9/1958 | Stickel | 429/147 |
| 3,272,656 | 9/1966 | Corbin et al. | 429/147 |
| 3,551,362 | 12/1970 | Decker | 429/253 X |
| 3,918,995 | 11/1975 | Palmer et al. | 429/147 |
| 4,205,123 | 5/1980 | Palmer et al. | 429/147 |

*Primary Examiner*—Anthony Skapars
*Attorney, Agent, or Firm*—Howard J. Troffkin

[57] ABSTRACT

The instant invention is directed to a sheet product capable of forming an improved battery separator. The present sheet product is formed from a thin, acid-stable, porous material and has a first and a second major face with a plurality of separate, continuous, open channels on each face such that each channel on each major face defines a separation between two channels on the other major face. Further, each channel defines an imaginary medium line with at least some portions of at least some channels extending laterally with respect to the imaginary medium line, and every portion of each channel is capable of being at an acute angle of not greater than 70 degrees from an imaginary vertical line oriented from bottom to top of a battery containing the sheet product.

21 Claims, 13 Drawing Figures

BATTERY SEPARATOR

This is a continuation-in-part application of U.S. application Ser. No. 195,918, filed Oct. 10, 1980, abandoned, which is a continuation application of U.S. application Ser. No. 51,175, filed June 22, 1979 and now U.S. Pat. No. 4,228,225.

BACKGROUND OF THE INVENTION

The present invention is directed to an acid-stable porous sheet product which has a structural configuration suitable for forming an improved battery separator, to an improved battery separator formed from said sheet product and to a battery, in particular to a lead-acid battery, which has the present improved separator located between adjacent plates of opposite polarity.

Storage batteries have been known and used for over a century. A conventional storage battery is formed of one or more units or cells, each of which has a positive electrode, a negative electrode, separator elements between electrodes of opposite polarity and an electrolyte, such as aqueous sulfuric acid solutions.

Separators for a lead-acid battery should prevent contact between electrodes of opposite polarity yet permit contact between electrode and excess electrolyte to produce efficient electrochemical reactions. For example, electrodes formed from lead and lead oxide must be maintained in contact with an excess of sulfuric acid electrolytic solution to permit the double sulfate reaction to occur between the electrode's material and the acid during discharge while also providing sufficient electrolyte for ionic transfer. Further, separators should permit the removal of gaseous products which are formed on the plate surfaces during the charging operation of any charge/discharge cycle. Oxygen is normally formed and evolved at the positive plates and hydrogen at the negative plates. The gaseous products are generally in the form of minute bubbles and may form at any point on an electrode plate surface. These bubbles are impediments to electrolyte/electrode contact required to have efficient battery operation.

In early battery designs, where compactness and energy density were not a prime objective, electrode elements of opposite polarity were maintained sufficiently apart by separator pins or posts which readily allowed the flow of electrolyte and egress of formed gaseous products.

In a modern storage battery, a group of interconnected plates forming the positive electrode is intermeshed with another group of interconnected plates which act as the negative electrode to give alternating positive/negative plate orientation within each cell of the battery. Each plate must be maintained apart from adjacent plates of opposite polarity by some form of separation means. Contact may be due to imperfections in plate structure or due to warping or wrinkling of a plate which normally occurs during operation of the battery as well as by other chemical or physical phenomena. The desire to develop batteries of compact, high specific capacity (electrical energy/unit weight) in which the separator membranes are sandwiched between electrodes of opposite polarity requires a separator which is capable of being formed from thin, light weight sheet material; providing means for the removal of gases; providing for electrode/electrolyte contact within a minimum spacing; and exhibiting the ability to withstand the compressive forces encountered from adjacent electrode plates. Such forces may tend to distort and sometimes permanently collapse the gaseous egress means designed in conventional separators. The separator component is recognised as a key element in forming a highly efficient battery.

Prior art separators used in lead-acid storage batteries have included various designs which provide spacer arrangements such as separators which are laminated with glass mat or which have armour ribs or projections formed on at least one major surface. Such separators are costly to form and add material and weight to the battery system. Further, separators which have glass mats as part or their structure have the defect of permitting gas bubbles to be lodged and retained within the mat's fiberous structure. Useful armour ribbed separators have heretofore only been formed from thick sheet stock since thin sheet material have been found too flexible from precluding effective alignment of the separator between adjacent electrode plates of opposite polarity.

Separators with spacing arrangements have also been formed from embossed sheet products. Various embossments are known and include straight corrugated configurations, such as described in U.S. Pat. No. 2,662,106, or projections, as described in U.S. Pat. Nos. 2,382,829; 2,465,493; 4,072,802; and 4,153,759. The known corrugated type of separators does not have structural integrity when formed from thin sheet stock. Thin corrugated separators have the defect of succumbing to the compressive forces and collapsing against a plate surface. Separators of straight corrugated design are suitable for gas release only when formed from rigid and thicker than desired stock. Separators having embossed separate projections, such as shown in U.S. Pat. Nos. 2,382,829 and 2,465,493, tend to trap gaseous products in their individual cavities. Separators such as shown in U.S. Pat. Nos. 4,072,802 and 4,153,759, are capable of being formed from thin sheet stock, but have conical projections which tends to block the egress of gaseous products. U.S. Pat. No. 4,228,225 is directed to a separator capable of being formed from thin sheet material and provides an embossed configuration having continuous vertically orientated gas egress paths. The presently described sheet product has a design which further enhances and promotes the removal of formed gaseous products while providing the other desired properties.

An object of the present invention is to provide a sheet product suitable for use as a battery separator.

A further object of the present invention is to provide a thin sheet product suitable as a battery separator which has paths on both sides of the battery separator for providing for and enhancing the removal of gaseous products formed within the battery.

A further object of the present invention is to provide a thin sheet product suitable for use as a battery separator which provides means for enhancing the removal of gaseous products while also providing substantial electrolyte to electrode contact to form an effective battery.

A still further object of the present invention is to provide a thin sheet product suitable for use as a battery separator which has means to provide for and enhance the removal of gaseous products, providing for good electrolyte to electrode contact and having sufficient resistance to mechanical forces encountered to maintain its configuration during use.

A still further objective of the present invention is to provide a thin porous sheet product suitable for use as a battery separator wherein the sheet has a first and a second major face with each face containing a plurality of separate continuous open channels such that each channel on one face defines a separation between two channels on the other face, that each of the channels has a configuration which has some degree of lateral extension beyond a minimum lateral extension of the channel with respect to an imaginary median line for that channel and substantially every portion of each channel, as viewed on the face, is oriented such that an imaginary tangent line to each portion of each channel and an imaginary vertical orientation line form an acute angle of no greater than 70 degrees from the vertical.

Another object of the present invention is to provide a porous sheet which has substantially uniform thickness throughout; having a configuration which provides improved gaseous egress means on both major surfaces and which can be formed into a wrap-around or enveloping configuration while maintaining the same improved gaseous egress means in said configurations.

Another object of the subject invention is to provide a sheet product suitable for use as a battery separator wherein the sheet has a first and a second major face with each major face containing a plurality of separate continuous open channels such that each channel on each face has a configuration which has some degree of lateral extension beyond a minimum lateral extension with respect to an imaginary median line for the channel, has substantially the tangent of every portion of each channel as viewed on the face orientated at an acute angle of no greater than 70 degrees with respect to the vertical, and wherein every cross-sectional area of any one channel is substantially the same along the total extension of the channel.

A further object of the present invention is to provide an acid-stable porous battery separator from a sheet product of this invention.

A further object of the present invention is to provide an acid battery having a container, an electrolyte at least one pair of electrode plates of opposite polarity and a separator formed from a sheet product of this invention positioned between and at least coextensive with each pair of electrode plates.

DETAILED DESCRIPTION OF PREFERRED EMBODIMENTS

The present invention is directed to sheet products useful as a battery separator. The subject sheet product has a structural configuration which provides continuous and enabling egress paths for the removal of gaseous products from a battery, provides a means of permitting good electrolyte/electrode contact while at the same time providing structural strength to resist compression forces even when the sheet product is formed from thin stock material. The separator of the present invention can be formed from a microporous sheet product and can be formed into individual substantially planar sheets or wrap-around U shape design while providing the continuous upward egress paths on all major surfaces of the separator.

Figure 1:
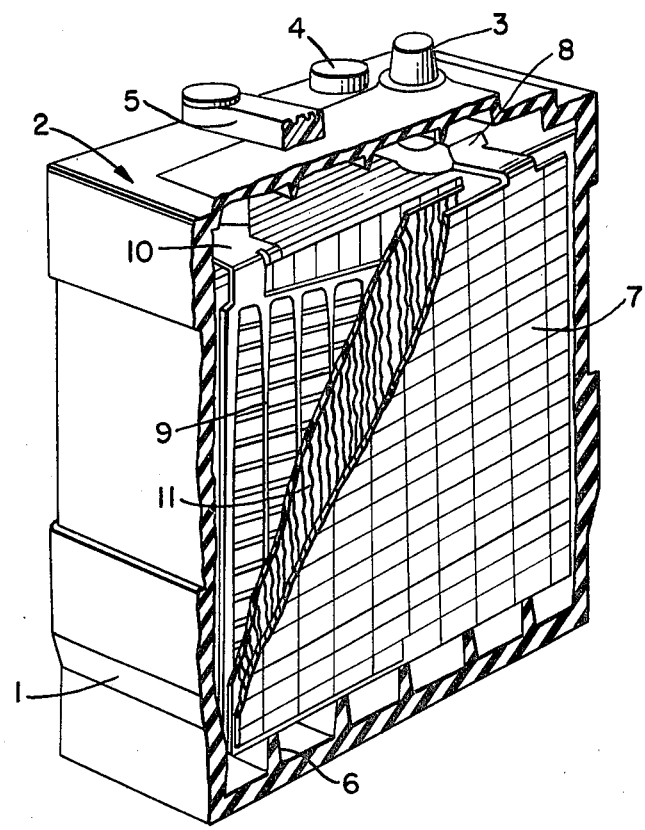
FIG. 1 is a cut-away view of a storage battery cell containing a separator membrane located between a positive and a negative electrode plate.
Figure 9:
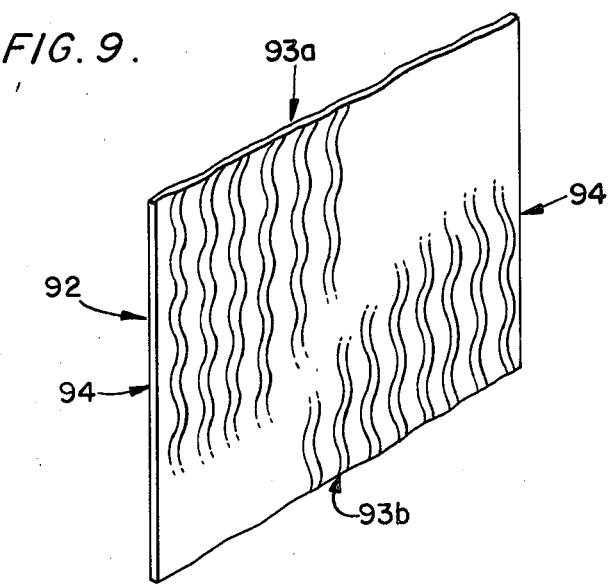
FIG. 9 is a perspective view of a single separator sheet element of the present invention.
Figure 9A:
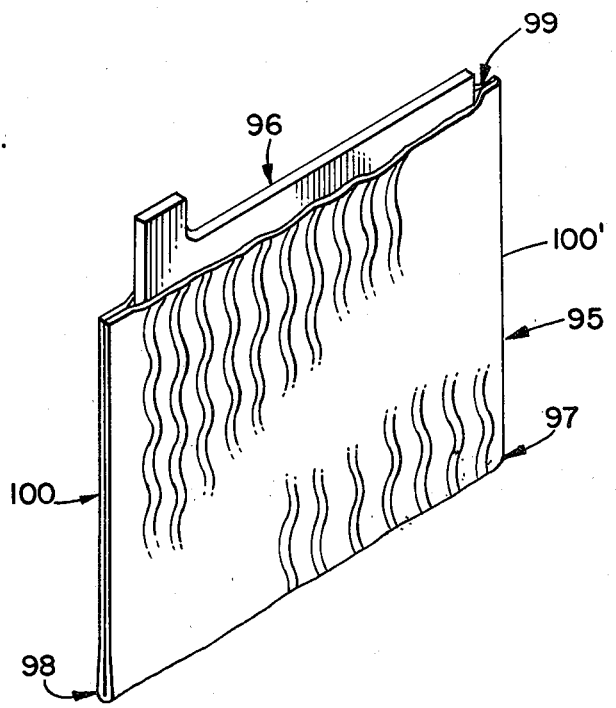
FIG. 9a is a perspective view of a single envelope-shaped separator formed from a sheet product of the present invention which has an electrode plate contained therein.

FIG. 1 illustrates a cell of a storage battery, such as a conventional lead-acid automotive type battery, formed from outer container 1 and cover 2 with its associated terminal post 3, vent plug 4 and inter cell connector 5. The bottom of container 1 normally has means 6, such as ribs, to support an electrode assembly. The assembly is made up of a negative electrode formed from a number of negative electrode plates 7 which are spaced from one another and connected by a negative connecting strap 8, and a positive electrode formed by a number of positive electrode plates 9 which are spaced from one another and connected by a positive connecting strap 10. The negative plates 7 are positioned in the space between each of two positive plates 9 to form an alternating sequence of negative-positive plates. Between each pair of plates of opposite polarity of the electrode assembly is separator 11 to prevent contact between the plates. The separator of the present invention can be used as individual sheet products between each pair of plates of opposite polarity as shown in FIG. 1 or can be wrapped around each of the positive or each of the negative plates such as in an open sided U configuration (edges of the separator sheet adjacent to the vertical side of battery container 1) or a closed sided, known in the art as an "envelope," configuration as shown in FIG. 9a and described in detail hereinbelow.

Figure 2:
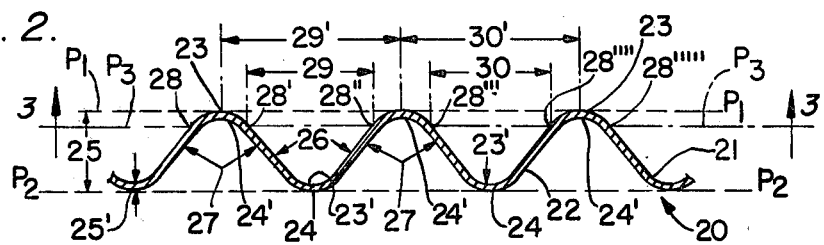
FIG. 2 is a cross-sectional view of a portion of a sheet product of the present invention.
Figure 3:
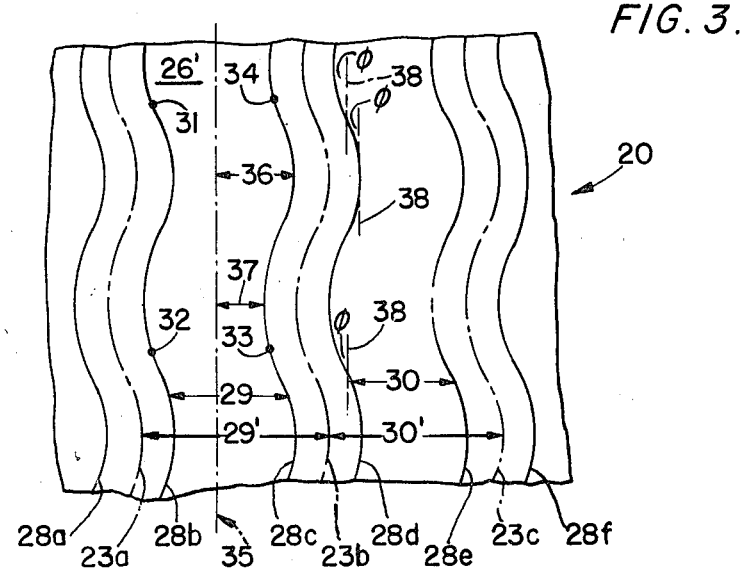
FIG. 3 is a planar view of a portion of the sheet product along plane $P_3$—$P_3$ of FIG. 2.

FIGS. 2 and 3 are described herein for purposes of identifying certain terms used throughout this specification and in the appended claims. FIG. 2 is an enlarged view of a typical cross-section of a portion of a species of a sheet product according to the present invention, and FIG. 3 is a planar view of the plane $P_3$—$P_3$ of FIG. 2. FIG. 2 represents a partial and enlarged cross-sectional view of a sheet product 20 contained within boundary plane $P_1$—$P_1$ and boundary plane $P_2$—$P_2$. The spacial relationship between planes $P_1$—$P_1$ and $P_2$—$P_2$ defines the sheets maximum spacial distance 25, which is the maximum spacial thickness of the sheet product 20. Sheet product 20 has a first major face 21 and a second major face 22. Sheet product 20 has a body thickness 25' which is the thickness between surfaces 21 and 22. The body thickness is generally of a substantially thin uniform dimension throughout sheet 20.

Each of the major faces of the sheet 20 forms a surface which has multiple extensions from its boundary plane towards the other boundary plane. Specifically, major face 21 is in the form of a surface which has apex portions 23 which are in closest spacial relationship to boundary plane $P_1$—$P_1$ relative to facial surfaces adjacent to each portion 23. Each apex portion 23 is generally contiguous with boundary plane $P_1$—$P_1$. Major face 21 has extended surface areas 26 which do not lie in plane $P_1$—$P_1$ but extend in the direction towards plane $P_2$—$P_2$ within the maximum spacial distance 25. Each extended surface area 26 is normally (with the possible exception of one which is adjacent to an edge of the sheet product) bound by spaced adjacent apex portions 23 of face 21. Therefore, each of such surface areas 26 forms an open channel on major face 21. Each portion of surface area 26 of face 21 which is bounded by two adjacent apex portions 23 has a nadir portion 23' which is the portion of surface area 26 extending closest to boundary plane $P_2$—$P_2$. The terms "raised surface area" and "depressed surface area" as used in this description and the appended claims are relative terms which define points on a surface of a sheet product of the present invention with respect to another point on the same surface and within the bounds of two adjacent apex points on that surface as viewed from a cross-sectional configuration with the surface apex points being positioned upwardly.

Similarly, face 22 forms a surface which has multiple apex portions 24 which have the greatest extension towards or are contiguous with boundary plane $P_2$—$P_2$ relative to facial surfaces adjacent to each portion 24. Major face 22 has extended surface areas 27 which extend within spacial distance 25 and from apex portions 24 toward plane $P_1$—$P_1$. Each extended surface area 27 is normally (with the possible exception of one which is adjacent to an edge of the sheet product) bound by spaced, adjacent apex portions 24 of face 22 which are closest to plane $P_2$—$P_2$ and, therefore, each of such extended surface areas 27 forms an open channel on major face 22. Each portion of surface area 27 forming a separate open channel bounded by two adjacent apex portions 24 has a nadir portion 24' which is a portion of surface 27 extending closest to boundary plane $P_1$—$P_1$. It can be seen that each extended surface area 26 which forms a channel on face 21 has a nadir portion 23' which corresponds, on face 22, to apex area 24 on extended surface 27 so that the channels on one major face form a separation on the other major face. The channel on one major face forms a separation between two adjacent channels on the other major face of the sheet product. FIG. 2 further shows an imaginary plane $P_3$—$P_3$ which is one of a number of planes which lies within planes $P_1$—$P_1$ and plane $P_2$—$P_2$ and intersects major face 21 at points 28, 28', 28", 28''', 28'''' and 28''''' of the extended surface areas of the face.

FIG. 3 is a planar view of intersect plane $P_3$—$P_3$ of FIG. 2 in which intersect contour lines 28a, 28b, 28c, 28d, 28e and 28f are the intersect lines of plane $P_3$—$P_3$ which extend from points 28, 28', 28", 28''', 28'''' and 28''''', respectively, on face 21. Imaginary contour lines 23a, 23b and 23c are each apex contour lines of each apex facial point 23, respectively, on face 21 as depicted in FIG. 2. Distance 29 between intersect contour lines 28b and 28c and distance 30 between intersect contour lines 28d and 28e represent the dimensional width of each open channel 26' on face 21 between paired points 28' and 28" and pair points 28'''' and 28''''', respectively.

Distance 29' between imaginary apex contour lines 23a and 23b and, similarly, distance 30' between imaginary apex contour lines 23b and 23c represent the facial dimensional width of each open channel 26'.

Each channel has a pattern. Each portion of the pattern of each channel can be defined with the aid of a pair of spaced contour lines formed by the intersect of an imaginary plane, such as $P_3$—$P_3$, with a facial surface of the sheet product. For example, contour lines 28b and 28c are spaced and define a channel pattern. The pattern bounded by intersect contour line 28b between points 31 and 32 and by intersect contour line 28c between points 33 and 34 represents a single cycle of a pattern which may again repeat itself along a segment of the open channel's extension. A channel pattern related area 31, 32, 33, 34 can be defined by connecting by straight lines each of the paired points 31, 32; 32, 33; 33, 34 and 34, 31. Any other pair of planar contour lines, either facial, such as by $P_1$—$P_1$, or intersecting, such as by $P_3$—$P_3$, can aid in defining the channel pattern. Line 35 is an imaginary median line of channel 26 such that, over any one cycle of the channel's pattern the imaginary median line 35 is straight and bisects the total area 31, 32, 33, 34 of the channel into equal average (arithmatic mean) areas. Imaginary median line may be curved or straight over the total extent of the sheet products. Channel 26' has, as a part of its pattern, extensions 36 which extend laterally from the median line to a greater distance than the minimum dimension 37 of the channels lateral extension. The channel's minimum lateral extension may be of a positive or negative value or substantially zero. When all lateral extensions of a pattern cycle of a contour line are located on the same side of an imaginary median line the minimum lateral extension is taken as a positive value. When all lateral extensions of a pattern cycle of a contour line are located on the same side of an imaginary median line and the minimum lateral extension touches the median line, the minimum lateral extension will be zero. When lateral extensions of a pattern cycle projects across the imaginary median line, the minimum lateral extension shall be considered a negative value and extensions on the opposite side as of positive value. A sheet product in which all of the channels have all lateral extensions equidistant from an imaginary median line does not exhibit the desired properties which are unexpectedly attained by the sheet product of the present invention.

Each of the channels of sheet product 20 has a pattern such that any apex contour line and any intersect contour line of any plane $P_3$—$P_3$ within the boundary planes $P_1$—$P_1$ and $P_2$—$P_2$ has all sections at an acute angle of not greater than about 70 degrees from a vertical orientation line when contained in a battery. For example, line 28d is an intersecting contour line of plane $P_3$—$P_3$ with respect to extended surface 26 of face 21. The sheet product 20 of FIG. 3 is orientated such that lines 38 each represent an imaginary vertical orientation line of the sheet product from bottom to top of a battery in use in which the sheet product is contained. The angle phi ($\phi$) is an acute angle from imaginary vertical line 38 to a tangent line of contour line 28d at the point of intersection with line 38. A preferred configuration of sheet product 20 will have an imaginary median line 35 of at least some of its channels in the form of straight lines, and the imaginary median line 35 is substantially vertically oriented when the sheet product 20 is contained in a battery.

Figure 4:
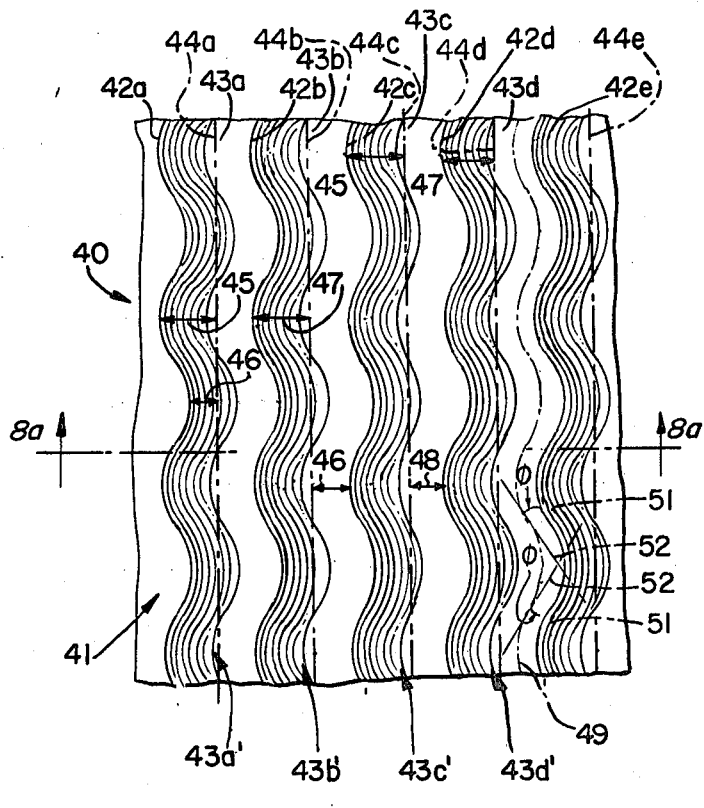
FIG. 4 is a planar view of a portion of a sheet product according to an embodiment of the present invention.

FIG. 4 is an enlarged view of a portion of one of the two major faces of a specie of a sheet product 40 of the present invention. The other major face of this specie is of a reverse configuration which is of substantially the same overall configuration as the face illustrated in FIG. 4. The shown portion of sheet product 40 has a major face 41 which contains continuous apex surface areas 42a, 42b, 42c, 42d and 42e in the form of apex contour lines which are the contour lines contiguous with or closest to an imaginary boundary plane of face 41. The apex surface areas 42a, 42b, 42c, 42d and 42e separate adjacent extended surface areas 43a, 43b, 43c and 43d and their respective nadir contour lines 43a', 43b', 43c' and 43d'. That is to say that apex surface area, such as 42b forms an apex contour line which separates adjacent extended surface area 43a from adjacent extended surface area 43b. Each of the extended surface areas forms an open, continuous channel. The terms "open" and "continuous" are separate and distinct terms, not meant to modify each other. The term "open" is meant herein and in the appended claims to define a channel which opens out from the face of the sheet product. The term "continuous" is meant herein and in the appended claims to define a continuous, non-segmented channel from one end to the other capable of having a continuous rising gaseous egress configuration when in use position.

With respect to each of the open continuous channels formed from extended surface areas 43a, 43b, 43c and 43d, one can form an imaginary median line 44a, 44b, 44c and 44d, which each bisect each of the extended surface areas, respectively. The channel of surface area 43a, as well as each of the other channels, has lateral extensions 45 with respect to the imaginary median line 44a which extends beyond the channel's minimum lateral extension 46 to form a channel 43a which has a curvilinear configuration. The curvilinear configuration is substantially sinusoidal. Similarly, channel 43b (the channel identification number in the present specification is the identification number of the extended surface forming the channel) has lateral extensions 47 with respect to its imaginary median line 44b which extend beyond the minimum lateral extension 48 of channel 43b with respect to median line 44b. Channel 43b is curvilinear in the form of a sinusoidal configuration. Channels 43c and 43d are of the same configurational nature as channels 43a and 43b. Each of channels 43a, 43b, 43c and 43d is nested with respect to each other or, stated another way, each of the channels 43a, 43b, 43c and 43d laterally extends to substantially the same extent in the same direction as the next adjacent channel on a line perpendicular to a median line. Although not illustrated, it is understood that other channels of sheet 40 can have curvilinear configuration which are not sinusoidal and/or nested but which still meet the requirements of the present invention.

Sheet product 40 has been found to form a battery separator which provides substantial electrolyte/electrode contact; resists compressive forces exerted on the major faces of the formed sheet product; and provides, when properly oriented within a battery as described hereinbelow, an improved gas egress means.

A sheet product of the present invention is capable of being placed in a battery in an orientation such that imaginary vertical orientation lines running from bottom to top of the battery in its use position and substantially (at least 85 percent, preferably at least 90 percent and more preferably 100 percent with any remaining amount forming an acute angle of from 70 to 90 degrees) all lines tangent to the contour lines of each of the channels of the sheet form an acute angle of up to 70 degrees and preferably up to 50 degrees at their point of intersection. For example, channel 43d of sheet 40 has a contour line 49 which is one of a multiplicity of contour lines that can be formed on the surface of face 41 between the apex contour line 43e of the raised surface area and the nadir contour line 43d' of the depressed surface area. If an imaginary line 51, having vertical orientation with respect to the top to bottom use position of a battery in which the sheet product 40 is contained, intersects with the tangent line 52 of contour line 49 the lines form an acute angle of up to 70 degrees from the vertical line 51 at substantially any point along the curvilinear contour line 49.

Figure 5:
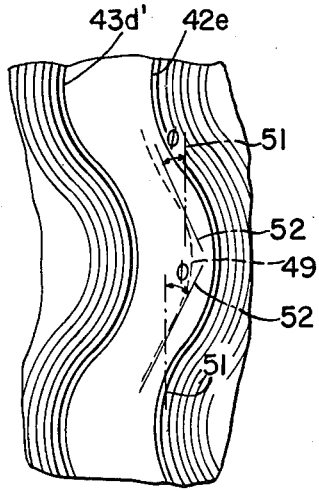
FIG. 5 is an enlarged geometric contour drawing of a portion of the face of the sheet product of FIG. 4.

FIG. 5 is an expanded view of a section of FIG. 4 to show, in greater detail, the contour orientation of the walls of the open channels of the sheet product of the present invention. Between nadir contour line 43d' and apex contour line 42e is drawn an intersect contour line 49 which is the intersecting line of the sheet product with a plane which is in substantially parallel relationship to at least one boundary plane of the sheet 40. Imaginary lines 51 are facially superimposed on contour line 49 of sheet 40 at a vertical orientation with respect to the battery in which sheet 40 is contained. Lines 52 are tangent lines of contour line 49 at the point of intersection with vertical line 51. The angle theta ($\phi$) is the acute angle formed between the imaginary vertical line 51 and imaginary tangent line 52.* The sheet products of the present invention should have open channels of a curvilinear design. Such design should have lateral extensions which extend beyond any minimum lateral extension with respect to the channel's medium line. Further the design must provide an acute angle theta of up to 70 degrees at substantially all points on any of each channel's contour lines. Apex or nadir contour lines are convenient contour lines to determine angle theta.

*The term "tangent line" as used in this disclosure refers to a straight line passing through two adjacent points on a curved or straight line segment of the contour line.

The imaginary vertical lines can be substantially parallel to an imaginary median line of one or more channels of a sheet product or can be at an angle thereto provided that the sheets use orientation permits the fulfillment of the channels' angular requirement as described above.

The channels of the sheet product should have curvilinear configurations which, in combination with each other, produce resistance to compression forces exerted on the sheet. It is preferred that at least about 20 and preferably about 50 percent of the curvilinear configuration of all the channels on any sheet laterally extend beyond the minimum lateral extension for each respective channel. Channels which, therefore, have substantially uniform lateral extension may be disposed between channels of more than one lateral extension. Alternatively, some or all channels may have extended segments which have a uniform lateral extension.

A sheet product of the present invention is preferably formed from a sheet stock of substantially uniform thickness. The overall configuration of the other major surface (not shown) of sheet product 40 is, therefore, substantially the reverse of major surface 41 shown in FIG. 4. The configuration of the first major surface is symetrically opposite to that of the second major surface.

Figure 6:
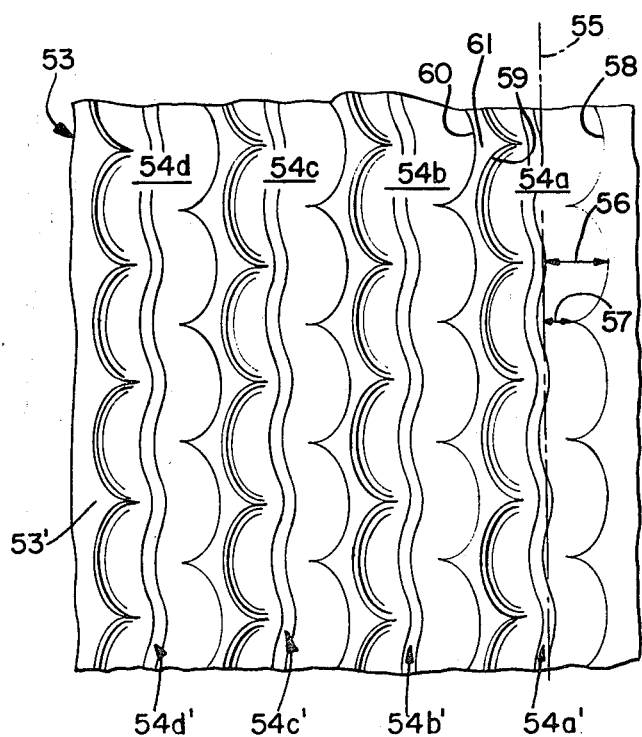
FIG. 6 is a planar view of a portion of a first major face of a sheet product according to one embodiment of the present invention.

FIG. 6 shows a portion of a specie of formed sheet product 53 according to the instant invention having a major face 53' with channels 54. Each individual channel 54a, 54b, 54c, 54d and additional ones are in the form of open, continuous channels. As shown with respect to channel 54a, the channel has a curvilinear configuration of substantially a toroidal design which defines an imaginary median line 55. The channel 54a has lateral extensions 56 which are greater than the minimum lateral extension 57 of the channel in relation to its imaginary median line 55. The lateral extensions 56 from one minumum extension 57 to the next is in the form of a section of a circle. Channel 54a has facial apex contour line 58 and facial apex contour line 59 which together define the surface area forming channel 54a. Adjacent channel 54b has a facial apex contour line 60 which is closest to apex contour line 59. The apex contour lines 59 and 60 of the two adjacent channels 54a and 54b, respectively, form an apex area 61 which is substantially planar and contiguous with an imaginary boundary plane of face 53'. Apex area 61 separates channels 54a and 54b. If the sheet product 53 is placed in a battery in a position such that the vertical orientation lines of the battery are parallel to each channel's imaginary median line 55, it can be readily observed that substantially all sections of contour lines 58, 59 and 60 are at acute angles of up to 70 degrees from the vertical.

Figure 7:
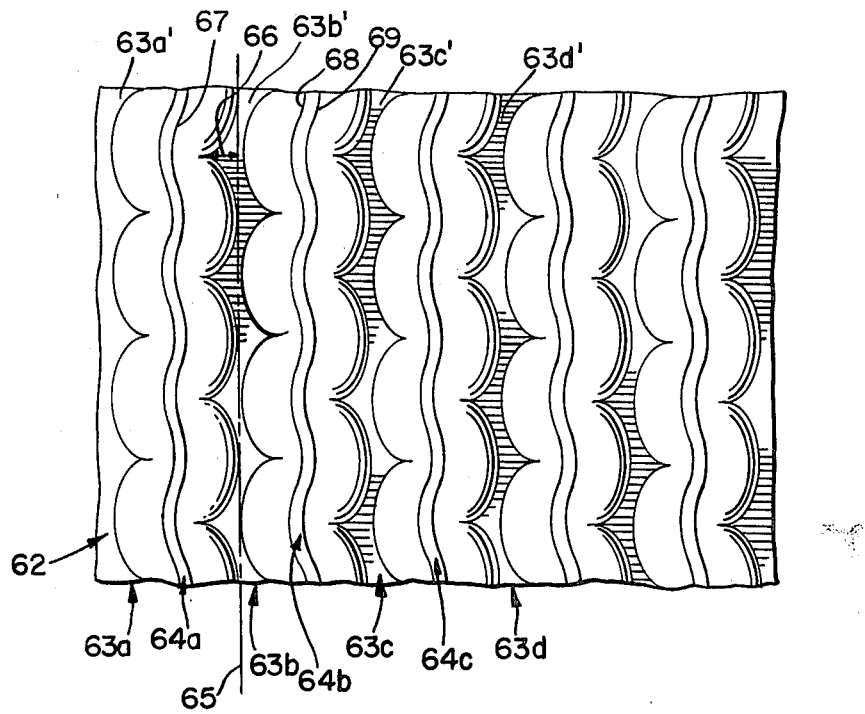
FIG. 7 is a planar view of a portion of a second major face of the sheet product of FIG. 6.

A segment of the second major face of sheet product 53 is illustrated in FIG. 7. FIG. 7 shows a major face 62 which has open continuous channels 63a, 63b, 63c, 63d and other similar channels thereon. Each of the channels 63a, 63b, 63c and 63d are separated from each other by apex surface areas 64a, 64b, and 64c and others which are the compliment of the nadir areas 54a', 54b' and 54c', respectively, of the channels of major face 53' shown in FIG. 6. Each channel is of substantially the same configuration as the next adjacent channel and is in nested relationship. The apex planar portions 61 of face 53' form the nadir planar portions 63a', 63b', 63c', and 63d' of each channel 63a, 63b, 63c and 63d, respectively. Using one channel to further describe the channel's configuration it is readily seen that imaginary median line 65 divides the average area of channel 63b into two equal areas. Channel 63b has lateral extensions 66 periodically along the channel on both sides of the median line. The nadir area 63b' of channel 63b on face 62 corresponds to the apex area 61 of face 53' of the same sheet 53. The apex contour lines of channel 63b are lines 67 and 68. Lines 67 and 68 form the boundary of the surface area on face 62 which forms channel 63b. An apex contour line 69 along with apex contour line 68 defines the boundary of the apex area 64b which is substantially planar and contiguous with the boundary plane of face 62 and forms a separation between channels 63b and 63c. This apex area 64b corresponds to the nadir area of channel 54b on face 53'.

It can be seen that the sheet products illustrated in FIGS. 4, 6 and 7 have each channel member on each of their two major surfaces of a configuration which, although having the required lateral extension, which extension is greater than any minimum extension of the channel, provides for essentially all of each channel's surfaces to be (a) open, (b) of a continuous upward orientation and (c) have all surface areas forming each channel capable of being at an acute angle of up to 70 degrees from an imaginary vertical orientation line of from bottom to top of a battery in which the sheet product is contained.

Figure 8A:
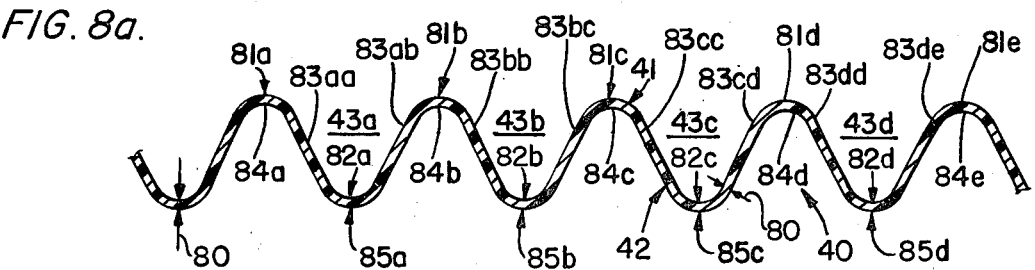
FIG. 8a, is a cross-sectional view of a portion of the sheet product of FIG. 4 along line 4—4.
Figure 8B:
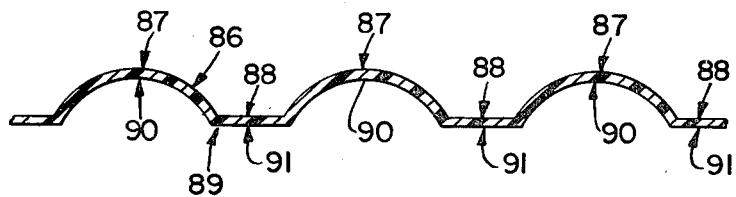
FIGS. 8b and 8c are cross-sectional views of alternate configurations of sheet products of the present invention.
Figure 8C:
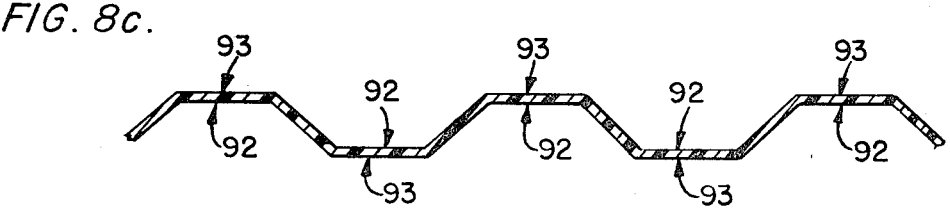

FIG. 8a is a cross-sectional view of the sheet product of FIG. 4 along line 8a—8a. Sheet product 40 has a first major face 41 and a second major face 42 which defines a substantially uniform body thickness 80. It is understood that the thickness 80 can have some variation over sheet 40 expanse. Such variation may be due to the processing of the starting material into the subject sheet product. The cross-sectional configuration can be continuously curvilinear of substantially sinusoidal form. Other alternate configurations are shown in FIG. 8b and 8c as described below. Face 41 of sheet 40 has apex points 81 which are individually indicated as 81a, 81b, 81c, 81d, and 81e and nadir points 82 which are individually indicated as 82a, 82b, 82c and 82d. Each of the apex points 81 are substantially coplanar and contiguous with an imaginary boundary facial plane of the sheet product 20. Further, each of the apex points 81a, 81b, 81c, 81d and 81e corresponds to a point on the apex contour line 42a, 42b, 42c, 42d and 42e respectively, which are shown in FIG. 4. Each of the nadir points 82 on face 41 are in spacial relationship with the imaginary facial plane of face 41. The facial surface areas 83 which are individually indicated as 83a-a, 83a-b, 83b-b, 83b-c, 83c-c, 83c-d, 83d-d and 83d-e are surface areas which extend between the apex points 81 and nadir points 82 on surface 21. The surfaces 83 along with nadir points 82 form channels 43a, 43b, 43c and 43d. For example, channel 43a is formed by surface areas 83a-a and 83a-b which, along with nadir point 82a extends from apex point 81a to apex point 81b. Channel 43a is separated from channel 43b by apex point 81b. Each other channel is similarly formed and separated from adjacent channel(s). It is readily seen that surface area 83aa and 83ab are each a "depressed surface area" with respect to apex points 81a and 81b respectively and can also be viewed as a "raised surface area" with respect to nadir point 82a.

The other major face 42 of sheet product 40 is substantially the reverse configuration of face 21. Each apex point 81 of surface 41 has a corresponding nadir point 84 which is individually indicated on FIG. 8a as 84a, 84b, 84c, 84d and 84e at corresponding points on face 42. Similarly, each nadir point 82 on surface 41 has a corresponding apex point 85 which is individually indicated as 85a, 85b, 85c and 85d on face 22. It is readily seen that any one channel on one surface forms a separation between adjacent channels on the other surface of the subject sheet product.

FIGS. 8b and 8c are illustrative examples of other cross-sectional configurations that can be used to form the open continuous channels of the sheet product of the present invention. FIG. 8b illustrates a cross-sectional configuration wherein one surface 86 has a single apex point 87 separating adjacent channels and the surface 86 has a multiple of nadir points which forms a nadir planar section 88 for each channel. The other surface 89 has a reverse configuration which, by definition, has a single nadir point 90 for each channel which corresponds to each apex point 87 on surface 86. Surface 89 has a multiple of adjacent apex points which forms apex planar sections 91 which, in turn, correspond to each nadir planar sections 88 on surface 86. Each apex section on one surface forms a separation between adjacent channels on the other surface.

FIG. 8c illustrates a cross-sectional configuration wherein for each channel on each face there is a multiple of nadir points forming a nadir planar section 92 as part of the channel and there is a multiple of apex points forming apex planar sections 93 separating adjacent channels.

It is realized that different channels formed on each face of a sheet product of the present invention can be of different cross-sectional configuration. Further, the facial configuration of each channel of a sheet product of the present invention can be different from the configuration of an adjacent channel. For example, certain channels on one face of a sheet product can have a sinusoidal configuration as described with respect to FIG. 4 hereinabove while other channels on the same face may have a toroidal configuration as illustrated in FIG. 6. Alternately, each channel on one face of a sheet product according to the present invention can have sections of one configuration and sections of another configuration.

It is to be also understood that any one channel of one face of the sheet product may have a configuration wherein its lateral extension of at least one surface forming the channel is of a substantially equal distance with respect to the channel's imaginary median line for some distance along the channel. However, such channels of equal lateral extension shall not form a part of the subject sheet product to a degree which would show any substantial decrease in compressive force resistance. The exact degree of channel or channel segment of equal lateral displacement permitted depends on the particular configuration of the remaining and, particularly, the adjacent channels, as well as the particular composition of the sheet product to produce non-collapsing compressive force resistance as can be determined by those skilled in this art. It is preferred that the sheet product forming a battery separator should have less than about 50 percent of all channels or channel segments of equal lateral displacement configuration.

The sheet products of the present invention are all formed from a porous sheet material of a substantially uniform thickness of from about 0.025 mm to about 1 mm, and preferably from about 0.1 mm to about 1 mm. The desired sheet product can be formed by embossing, pressing, or the like conventional processing techniques of a material that has a substantially uniform body thickness (providing for stretching and the like during formation). The maximum spacial thickness of the formed sheet product can range from about 0.25 mm to about 5 mm. although greater or lesser maximum spacial thickness may be formed for particular applications.

The sheet material used to form the present invention must be formed of an acid-stable composition. The composition preferably comprises a thermoplastic polymer and an acid resistant inorganic filler. The preferred compositions include from about 20 to about 75 percent and preferably from about 30 to about 60 percent by weight of a thermoplastic polymer and from about 25 to 80 percent and preferably from about 30 to 75 percent by weight of an acid resistant inorganic filler. The preferred thermoplastic polymer is a resin containing at least one resin selected from a polymer or copolymer of ethylene, propylene, butylene, vinyl chloride, acrylic or styrene. The more preferred polymer would contain at least 50 percent ethylene units. The preferred composition may contain additional materials such as plasticizer, oil, stabilizers, wetting agents and the like.

The sheet material used to form the present invention can also be formed from thermoset resinous compositions. The composition must be formed into the proper configuration prior to or while being subjected to sufficient elevated temperature conditions to cause curing of the resinous material. Thermoset compositions capable of forming the present sheet product include compositions containing thermoset resins as, for example, phenolics, EPDM (ethylene/propylene/diene), sulfur cured isoprene, butadiene, styrene and the like, as well as those described in U.S. Pat. No. 3,551,362.

The sheet material used to form the product of the present invention should be porous, that is to say have an open pore structure. The pores should be generally between about 0.01 and about 40 microns in diameter. The sheet product must be formed in a manner which does not fuse or close the structure of the pores. The complete collapse of the pores or even the collapse or closure of the pore structure at the surface of the formed sheet product would yield a sheet product, which, when used as a battery separator, would exhibit increased electrical resistance characteristics. It is understood that some reduction in pores' aggregate size may occur during processing and formation of the present sheet product. Such reduction can be tolerated.

The subject sheet products of the instant invention have been found to provide an improved battery separator, particularly for use in an acid battery system. One preferred embodiment of the separator is that it be in the form of individual sheets. Each sheet has boundary edges which define dimensions of the major surfaces of the sheet product such that the dimensions are at least substantially equal to the electrode plates between which it is contemplated that the sheet product is to be positioned. Referring to FIG. 9, sheet 92 has a substantially rectangular facial configuration bound by top edge 93a, bottom edge 93b and side edges 94. The terms "top", "bottom" and "side" refer to orientation with respect to a battery in which the sheet product is used as a separator. The top edge 93a is contemplated to be the edge of the separator in closest spacial relationship to the top of the battery when it is in its normal use orientation. Similarly, bottom edge 93b is the edge contemplated to be in closest spacial relationship with the bottom of the battery when it is in its normal use orientation. The separator should be formed from a sheet product described hereinabove such that each channel on both major faces of the separator are open, continuous channels which have their surface areas continuously open or directed upwardly in its use orientation.

The configuration requirements of the subject separator not only provide the desired properties discussed above but also provide a sheet product which can interchange its top edge 93a with its bottom edge 93b when placed between plates of opposite polarity without sacrificing any of the desired properties. This further provides one with the ability to form a separator of a wrap around or U configuration from a single piece of a sheet product of the present invention. FIG. 9a illustrates a separator 95 wrapped around an electrode plate 96 in a U configuration. The separator 95 is formed by forming a fold from a point 97 on one side edge to a point 98 on the opposite side edge, wherein points 97 and 98 are approximately equidistant from one top edge 99 of the separator. The side edges on each side of the separator which are contiguous with other portions of the same side edge can be sealed together to form sealed edges 99 and 100, such as by conventional heat sealing or ultrasonic welding of thermoplastic sheet product. Such "pocket" design further eliminates battery failure problems caused by contact of plates of opposite polarity via precipitate or scale material conventionally known as "shed" or "mud" material which has accumulated at the bottom of the battery container.

The sheet product of the present invention can be readily formed into a separator providing good electrolyte/electrode contact; improved gas egress means; good resistance to deformation by compressive forces; and can further facilitate formation of a battery due to its ability to be reverse oriented from top to bottom when placed in use position, or can facilitate forming a still further improved battery by its ability to be formed into a U configuration capable of inhibiting contact of plates of opposite polarity via shedded active material and the like accumulation.

Figure 10:
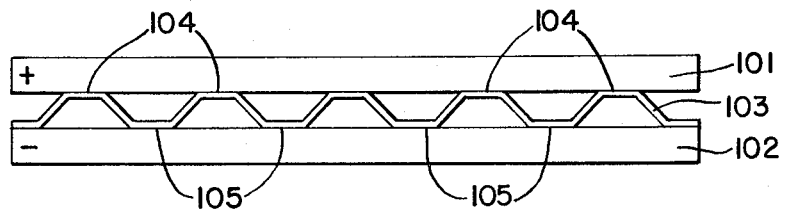
FIG. 10 is a cross-sectional view of a portion of a separator of the present invention engaged between electrode plates of opposite polarity.

FIG. 10 shows a cross-sectional view of a pair of electrode plates of opposite polarity with a separator membrane positioned there between as in an operating battery. The positive plate 101 and negative plate 102 are contiguous with the imaginary boundary facial planes of the separator such that the surface areas separating each of the adjacent channels on each of the faces are in substantial contact with the electrode plate adjacent to that face. It is preferred that the separator be oriented to provide surface areas of reduced porosity 104 (due to compression and the like processing parameters) toward or in contact with the positive electrode plate 101 while surface areas of greater porosity 105 are orientated toward or in contact with the negative electrode plate 102. However, the battery separator's performance is almost equal when the battery separator's surface areas in contact with each plate member are reversed such that surface areas 104 engage the negative plate 102 and surface areas 105 engage the positive plate 101.

Each of the apex areas separating adjacent channels on any one surface of a sheet product of the present invention is substantially contiguous with a boundary facial plane of the sheet product. It is preferred that each apex area separating adjacent channels on any one face of a sheet is at least about 75 percent, or preferably about 90 percent, and still more preferred substantially 100 percent, continuous and contiguous with its boundary facial plane from the bottom to the top of the battery separator face. Each continuous apex surface area should be completely isolated from other apex surface areas on the same face of the sheet product. Adjacent apex surface areas on a face of the sheet product can have a spacial relationship of equal distance (such as formed by the nested configuration of sheet product of FIG. 4) or of varied distances (such as formed by an unnested configuration) from one apex surface area to the next over the total extension of each apex surface area. The apex surface area on any one battery plate should not exceed about 50 percent, and preferably about 30 percent, of the total surface area of the major face adjacent to the plate. Further, the spacial distance between adjacent apex surface areas may be such as to provide at least two open continuous channels per 25 mm although less channels may be suitably formed by certain configuration and still retain the desired properties.

It will be obvious to those skilled in the art that various changes and modifications may be made in the invention without departing from its true spirit and scope. It is, therefore, aimed in the appended claims to cover all such equivalent variations as fall within the true spirit and scope of the invention.

What is claimed is:

1. A sheet product suitable for use as a separator in an acid battery comprising an acid-stable porous sheet material, said sheet material having first and second faces formed within spaced planes containing said faces and into a plurality of separate continuous open channels on each of said faces, each channel on each face defining a separation between two channels on the other face, each of said channels defining an imaginary median line, at least some portions of at least some of said channels extending laterally with respect to said median line such that the overall channel configuration of said sheet has at least about 20 percent extending laterally beyond the minimum lateral extension for each channel, and said channels being so configured that a tangent to substantially any portion of each of said channels is oriented at an acute angle theta of no greater than 70 degrees with respect to an imaginary vertical line oriented from bottom to top of a battery containing at least one separator formed from said sheet product.

2. The sheet product of claim 1 wherein said planes are spaced substantially parallel planes and the lateral extension beyond the minimum lateral extension is at least 50 percent based on the overall channel configuration of said sheet.

3. The sheet product of claim 1 wherein the cross-sectional area of any one of said channels taken perpendicular to said channel's imaginary median line is substantially the same along the total extension of said channel.

4. The sheet product of claim 1 wherein substantially every portion of each of said channels is oriented at an angle theta of no greater than 50 degrees.

5. The sheet product of claim 1 wherein at least some of said channels are generally of a sinusoidal configuration when viewed on either of said first face or of said second face.

6. The sheet product of claim 5 wherein at least some portion of each channel is generally of a sinusoidal configuration when viewed on either of said first face or of said second face.

7. The sheet product of claim 1 wherein each of said channels is substantially similar to the other in general configuration when viewed from each of said first and second faces and is substantially curvilinear.

8. The sheet product of claim 1 wherein said sheet product is comprised of from about 20 to about 75 weight percent of a thermoplastic resin, and from about 25 to about 80 weight percent of an acid resistant inorganic filler.

9. The sheet product of claim 1 wherein the sheet thickness is from about 0.025 mm to about 1 mm, the maximum spacial thickness is from about 0.25 mm to about 5 mm and said sheet has at least two channels on each of said faces per 25 mm horizontal dimension of each sheet.

10. The sheet product of claim 1 wherein the imaginary median line is a substantially straight line.

11. The sheet product of claim 7 where at least some of said channels is nested with respect to said adjacent channel.

12. The sheet product of claim 11 wherein said curvilinear form is sinusoidal.

13. The sheet product of claim 8 wherein said resin contains at least one resin selected from the group consisting of polymers and copolymers of ethylene, propylene, butylene, vinyl chloride and styrene.

14. The sheet product of claim 12 wherein each imaginary median line is a substantially straight line.

15. A battery separator suitable for use between a pair of electrode plates of opposite polarity contained in an acid battery, said separator formed from the sheet product of claims 1, 2, 3, 4, 5, 6, 7, 8, 9, 10, 11, 12, 13 or 14 and having dimensions which are at least coextensive with the dimension of the pair of electrode plates between which it is to be positioned.

16. A battery separator of claim 15 wherein the outermost portion of each separation between channels on each of said faces is capable of being at least 75 percent in continuous contact with an adjacent electrode plate when contained in a battery.

17. The battery separator of claim 15 wherein the sheet product is of a configuration selected from a substantially planar or of a substantially U shape configuration.

18. A battery comprising a container, an acidic electrolyte, at least one pair of electrode plates of opposite polarity and a sheet product positioned between adjacent electrode plates of opposite polarity, wherein said sheet product is a separator of claim 15.

19. The battery of claim 18 wherein each separator is of a U shape configuration wrapped around each electrode plate of the same polarity.

20. The battery of claim 18 wherein each separator is positioned between pairs of electrode plates of opposite polarity such that an equal or greater amount of separator sheet product is in contact with the electrode plate of negative polarity.

21. The sheet product of claim 1, wherein at least one of said channels has sections of one configuration and sections of another configuration along the total extension of at least one of said channels when viewed on either of said first face or of said second face.

* * * * *

UNITED STATES PATENT AND TRADEMARK OFFICE
CERTIFICATE OF CORRECTION

PATENT NO. : 4,368,243

DATED : Jan. 11, 1983

INVENTOR(S) : Dennis D. O'Rell et al

It is certified that error appears in the above-identified patent and that said Letters Patent are hereby corrected as shown below:

In the Abstract, lines 9 and 11, change "medium" to -- median --.

In column 1, line 33, change "ionic" to -- ion --.

In column 2, lines 17-18, delete "material have been found too flexible from precluding" and insert -- materials have been found to be too flexible to preclude --.

In column 3, line 63, change "4-4" to -- 8a-8a --.

In column 10, lines 25-26, delete "83a-a, 83a-b, 83b-b, 83b-c, 83c-c, 83c-d, 83d-d and 83d-e" and insert -- 83aa, 83ab, 83bb, 83bc, 83cc, 83cd, 83dd and 83de --.

In column 10, line 30, delete "83a-a and 83a-b" and insert -- 83aa and 83ab --.

In column 10, line 41, change "21" to -- 41 --.

In column 10, line 47, change "22" to -- 42 --.

In claim 15, lines 1-2, delete "a pair of" and insert -- adjacent --.

UNITED STATES PATENT AND TRADEMARK OFFICE
CERTIFICATE OF CORRECTION

PATENT NO. : 4,368,243

DATED : Jan. 11, 1983

INVENTOR(S) : Dennis D. O'Rell et al

It is certified that error appears in the above-identified patent and that said Letters Patent are hereby corrected as shown below:

In claim 20, line 2, delete "pairs of" and insert -- adjacent --.

Signed and Sealed this

Twenty-second Day of March 1983

[SEAL]

Attest:

GERALD J. MOSSINGHOFF

Attesting Officer     Commissioner of Patents and Trademarks